No. 801,266. PATENTED OCT. 10, 1905.
H. H. PULVER.
PACKAGE ARRANGING MACHINE.
APPLICATION FILED MAY 27, 1903.

2 SHEETS—SHEET 1.

Witnesses
Walter B. Payne
Willard Rich

Inventor.
Henry H Pulver
Frederick H Church
his Attorney

No. 801,266. PATENTED OCT. 10, 1905.
H. H. PULVER.
PACKAGE ARRANGING MACHINE.
APPLICATION FILED MAY 27, 1903.

2 SHEETS—SHEET 2.

Witnesses. Inventor.

UNITED STATES PATENT OFFICE.

HENRY H. PULVER, OF ROCHESTER, NEW YORK, ASSIGNOR, BY MESNE ASSIGNMENTS, TO PULVER CHOCOLATE AND CHICLE MANUFACTURING COMPANY, OF ROCHESTER, NEW YORK, A CORPORATION OF NEW YORK.

PACKAGE-ARRANGING MACHINE.

No. 801,266.            Specification of Letters Patent.           Patented Oct. 10, 1905.

Application filed May 27, 1903. Serial No. 159,016.

*To all whom it may concern:*

Be it known that I, HENRY H. PULVER, of the city of Rochester, in the county of Monroe and State of New York, have invented certain new and useful Improvements in Package-Arranging Machines; and I do hereby declare the following to be a full, clear, and exact description of the same, reference being had to the accompanying drawings, forming a part of this specification, and to the reference-numerals marked thereon.

My present invention relates to mixing-machines of a character particularly adapted for use in sorting articles or packages of a similar nature into a varied assortment, and has for its object certain improvements in such devices whereby such a machine may be produced in which the articles or other objects to be assorted may be fed to the machine in removable or permanently-attached clips or containers, each containing articles or objects of a similar nature only, and whereby in the operation of the machine the articles or objects carried by said clips or containers are automatically delivered to a chute or other suitable receptacle in any desired or prearranged order; and to these and other ends the invention consists in certain features of novelty hereinafter described, and pointed out in the claims at the end of this specification.

Figure 1:
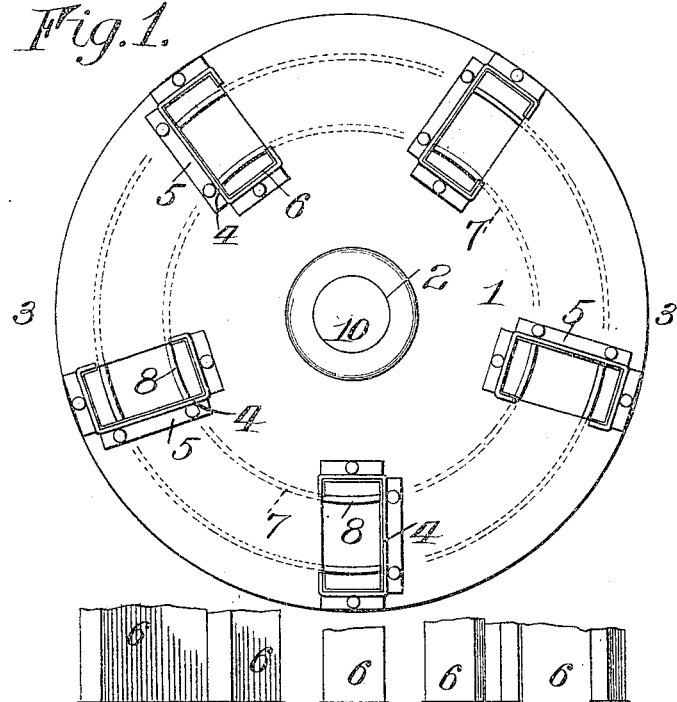
Figure 1:
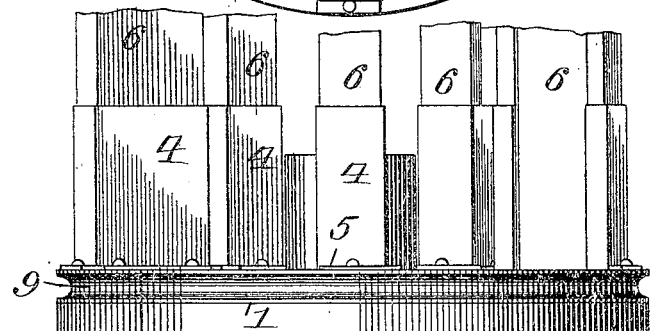
Figure 2:
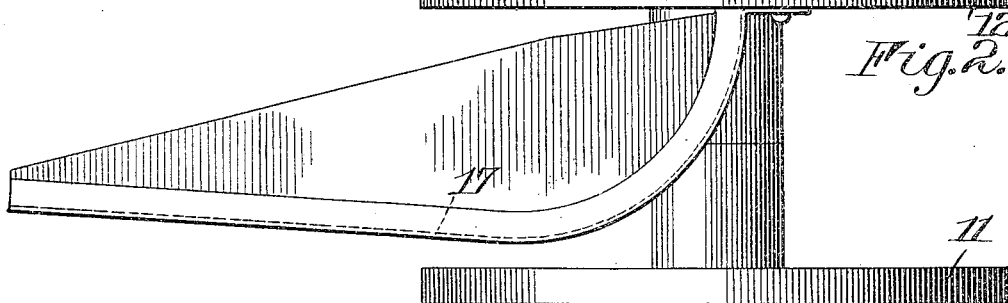
Figure 3:
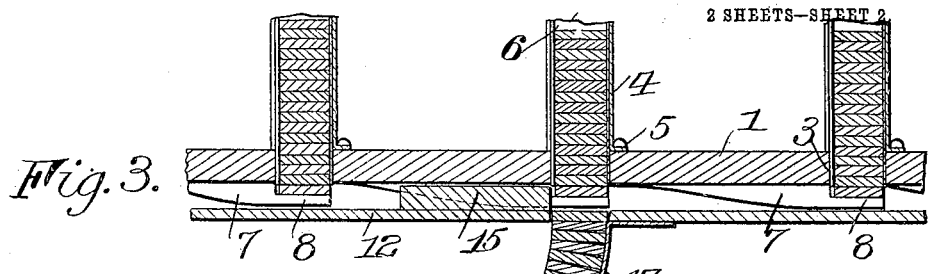
Figure 4:
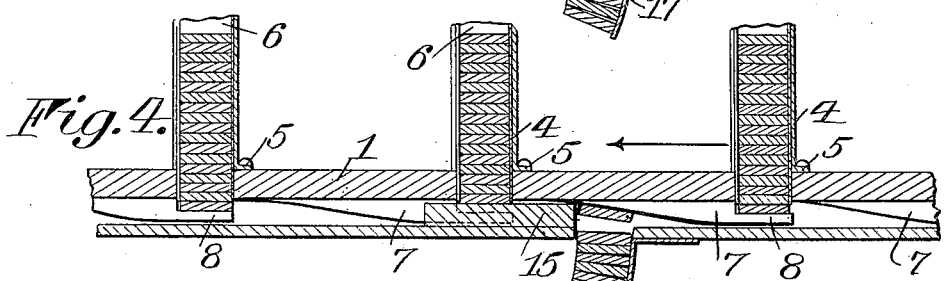
Figure 5:
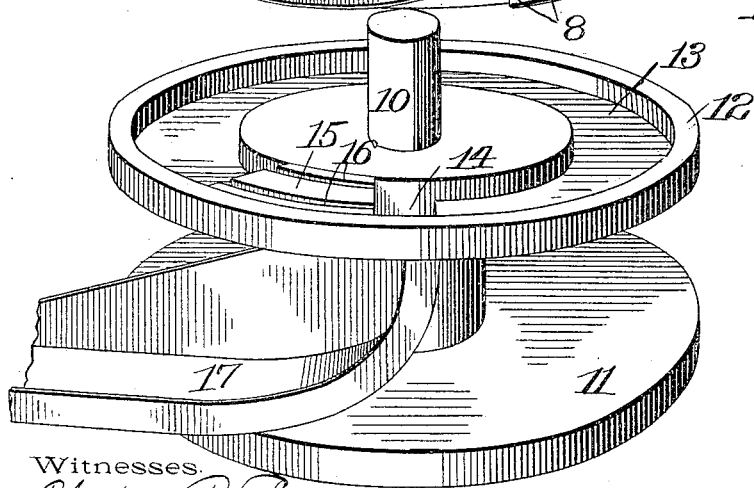

In the drawings, Figure 1 is a plan view of a machine embodying my said improvements, parts being omitted. Fig. 2 is a side elevation of the same, parts being broken away. Fig. 3 is a fragmentary vertical sectional view taken on the line 3 3 of Fig. 1, showing an article about to be delivered from its clip. Fig. 4 is a similar view, the article being in a position to enter the chute or receptacle; and Fig. 5 is a collective view of the machine, the parts being disassembled or separated for clearness in illustration.

Similar reference-numerals indicate similar parts throughout the several views.

1 respresents a rotatable carrier or table, shown in the present embodiment as circular in shape and provided with an aperture 2, located centrally thereof. Circumferentially arranged upon this rotatable carrier 1 are a plurality of apertures 3, any desired number of which may be provided. Upon the upper surface of this carrier 1 and directly above each of the apertures 3 therein are provided a plurality of holders 4, secured in position in any desired manner. These holders 4 may be made of any suitable material, such as sheet metal, and are bent into the form shown in Fig. 1, the lower edges being bent at right angles, forming lugs 5, through which may be passed any suitable means for securing these holders in position. Into these holders 4 are adapted to interchangeably or permanently fit the containers or clips 6 of any desired length. These clips or containers are shown in the present embodiment as removable and may be slipped into position in their holders from the top thereof, the lower ends of these clips preferably extending through the apertures 3 to the lower face of the carrier, the clips preferably fitting sufficiently tight in their respective holders to support them in proper position on the carrier.

Circularly arranged upon the under side of the carrier 1 are a plurality of depending retainers 7, each recessed at one end to form the extended fingers 8, disposed immediately beneath the apertures 3, while the lower edges of said retainers are inclined or beveled as the opposite ends are approached, the purposes of which will hereinafter appear. Upon the periphery of this carrier 1 may be formed a groove 9, adapted to receive a belt, or, if desired, any other suitable means may be employed for transmitting motion to said carrier. Into the aperture 2 of said carrier is adapted to fit the stud-shaft 10, rigidly carried upon the base or standard 11, forming a bearing upon which the carrier 1 may rotate. Upon this base 11 is also carried a disk 12, provided with an annular recess 13, around which the retainers 7 are adapted to travel. 14 is an aperture formed in this recess 13, and immediately adjacent this aperture 14 is located an ejecting-abutment 15, extending across the annular recess 13 and provided with a pair of recesses 16, through which the retainers 7 are adapted to pass. Beneath the aperture 14 a chute or other suitable receptacle 17 may be provided, into which the assorted articles are deposited ready for distribution.

As motion is imparted to the carrier 1 in the direction indicated by the arrow, Fig. 4, the retainers 7 will travel around the annular recess 13 in a circular path, passing freely through the grooves 16 in the abutment 15.

Each clip 6 having been previously filled with articles or packages, articles or packages of the same kind being placed in the same clip and each clip holding articles or packages of a different kind, said clips may be slipped down into their respective holders 4 upon the carrier. The lowermost article or package in each clip will then be held by the fingers 8, formed in the retainers 7.

Referring to Fig. 3, it will be seen that when the article or package carried by the fingers 8 of the retainers 7 abut against the ejecting-abutment 15 in the path of said article or package its motion will be arrested and continued motion of the retainer will cause the article or package to be ejected from the retainer-fingers 8, the remaining articles or packages in that particular clip being held in position by the upper surface of the ejecting-abutment 15. Further motion of the carrier will now bring the inclined or beveled surface of the following retainer into engagement with the upper surface of the article, positively forcing the same down into the receptacle 17 directly beneath. This operation will occur each time the containers and their respective retainers pass over the aperture 14, causing an article or package to be forced down into the chute or receptacle successively at regularly-recurring intervals.

As each of the clips or containers hold articles or packages of a different kind, it is obvious that the articles or packages delivered into the chute or receptacle will be of a varied assortment, which assortment may be predetermined or may be varied, as desired, by altering the relative position and number of the chutes upon the carrier.

While this machine is particularly applicable for use in assorting small packages containing chewing-gum, candy, and the like, it will of course be understood that I do not so limit myself, as the same may be employed for various other purposes, as will be obvious to those skilled in the art, but one embodiment of my said invention being herein shown and described.

I claim as my invention—

1. In a device of the character described, the combination with base or support, and carrier movably mounted thereon and carrying package or article holders, of a relatively fixed delivery device located in the path of the articles or packages in the holders for removing them from the latter during the operation of the carrier and having an extended bearing-surface for positioning the next article of the holder.

2. In a device of the character described, the combination with base or support, and carrier movably mounted thereon and carrying article or package holders, of a relatively fixed delivery device located in the path of the articles or packages in the holders for removing them successively as the carrier is operated, and a chute having its receiving-aperture immediately adjacent the delivery device for maintaining the articles or packages in the order in which they are delivered from the holders and devices for positively feeding the articles into the chute.

3. In a device of the character described, the combination with base or support, relatively movable carrier mounted thereon, and carrying one or more article or package holders, and a retaining device having spaced fingers at one end extending beneath the package-holder for supporting the articles contained therein, of an ejector located in the path of the articles in the holder having recesses to permit the passage of the fingers of the retaining device and to engage the lowermost article supported thereon to remove it during the operation of the carrier.

4. In a device of the character described, the combination with base or support having relatively movable carrier mounted thereon, and package-holders movable with the carrier, of a package-retaining device for each holder having supporting-fingers upon which the packages rest, and inclined portions opposite the fingers, and a delivery device located in the path of the packages for displacing them from the supporting-fingers, and coöperating with the inclined portions of the retaining devices for positively ejecting the packages.

5. In a device of the character described, the combination with base or support, and carrier revolubly mounted thereon having package-holders arranged circularly thereon, of a retaining device for each holder embodying the curved members having supporting-fingers at one end extending beneath the package-holder, and having their under sides inclined, and a delivery device coöperating with the package to disengage it from the fingers and coöperating with the inclined portions of the retaining device to eject the package.

6. In a package-arranging machine, the combination of a base, a rotatable carrier mounted thereon, clips removably mounted upon said carrier, retainers for said clips, and delivery mechanism coöperating with said retainers for delivering an article or package from each clip successively.

7. In a package-arranging machine, the combination of a base, a rotatable carrier mounted thereon, a plurality of clip-holders mounted upon said carrier, clips adapted to fit into said holders, retainers for said clips, and delivery mechanism coöperating with said retainers for delivering an article or package from each clip successively.

8. The combination of a base, a rotatable carrier mounted thereon, a plurality of holders mounted upon said carrier, containers removably fitted into said holders, retainers for said containers, an abutment coöperating with said retainers for delivering an article or package from each container successively, and a receptacle into which said articles or packages are deposited.

9. The combination with a base, a rotatable carrier mounted thereon and a plurality of clips mounted upon said carrier, of retainers for said clips having cam-surfaces extending beneath each clip, and delivery mechanism coöperating with said retainers and cam-surfaces for delivering an article or package from each clip successively.

10. In a package-arranging machine, rotatable carrier, clip-holders arranged upon said carrier and clips slidingly fitting into said holders.

11. In a package-arranging machine, rotatable carrier, clip-holders arranged upon said carrier, clips removably fitted into said holders, and retainers normally closing the lower ends of said clips.

12. In a package-arranging machine, rotatable carrier, a plurality of clip-holders circularly arranged upon said carrier, clips removably fitted into said holders, retainers upon said carrier beneath said clips, and a stationary releasing member coöperating with said retainers for delivering an article or package from each of said clips successively.

13. The combination of a base, a rotatable carrier, article or package containers carried by said carrier, an ejecting-abutment, retainers upon said carrier and coöperating with said abutment, whereby the passage of said retainers will cause an article or package to be ejected from said retainers successively.

14. The combination of a base, a rotatable carrier, article or package containers carried by said carrier, an ejecting-abutment, retainers upon said carrier having their lower edges inclined or beveled toward one end to coöperate with said abutment whereby the passage of said retainers will cause an article to be ejected from said retainers and to be depressed by the inclined edges of the succeeding retainer.

15. The combination with a base, a rotatable carrier, and article or package containers carried by said carrier, of retainers comprising a series of beveled or inclined members each having retaining-fingers extending across the lower end of said containers and an ejecting-abutment provided with depressed grooves to allow the passage of said retainers but to arrest the motion of the article upon said retainer causing it to be ejected so that the inclined surfaces of the retainer following will bear upon and force the article downwardly into a receptacle.

HENRY H. PULVER.

Witnesses:
G. WILLARD RICH,
ELIZABETH J. PERRY.